United States Patent
Chae et al.

(10) Patent No.: US 10,897,787 B2
(45) Date of Patent: Jan. 19, 2021

(54) METHOD AND APPARATUS FOR DEVICE-TO-DEVICE USER EQUIPMENT TO TRANSMIT DISCOVERY SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/124,936

(22) PCT Filed: Mar. 11, 2015

(86) PCT No.: PCT/KR2015/002347
§ 371 (c)(1),
(2) Date: Sep. 9, 2016

(87) PCT Pub. No.: WO2015/137720
PCT Pub. Date: Sep. 17, 2015

(65) Prior Publication Data
US 2017/0027011 A1 Jan. 26, 2017

Related U.S. Application Data

(60) Provisional application No. 62/033,639, filed on Aug. 5, 2014, provisional application No. 62/031,155, filed
(Continued)

(51) Int. Cl.
H04W 4/02 (2018.01)
H04W 76/14 (2018.01)
(Continued)

(52) U.S. Cl.
CPC ............ *H04W 76/14* (2018.02); *H04W 52/10* (2013.01); *H04W 52/245* (2013.01);
(Continued)

(58) Field of Classification Search
CPC ..... H04W 52/10; H04W 52/36; H04W 72/04; H04W 72/08; H04W 8/00
See application file for complete search history.

(56) References Cited

U.S. PATENT DOCUMENTS

2013/0021929 A1* 1/2013 Kim ....................... H04B 7/024
370/252
2013/0059583 A1 3/2013 Van Phan et al.
(Continued)

FOREIGN PATENT DOCUMENTS

GB 2501088 A 10/2013
JP 2010-283632 A 12/2010
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.5.0, Dec. 15, 2013, 15 pages.
(Continued)

*Primary Examiner* — Anez C Ebrahim
(74) *Attorney, Agent, or Firm* — Birch, Stewart, Kolasch & Birch, LLP

(57) ABSTRACT

One embodiment of the present invention relates to a method for a device-to-device (D2D) user equipment to transmit a discovery signal in a wireless communication system, the method comprising the steps of: choosing a resource pool from among one or more resource pools; and transmitting a discovery signal by using the resources of the
(Continued)

chosen resource pool, wherein the resource pool is chosen on the basis of RSRP measurement results.

9 Claims, 7 Drawing Sheets

Related U.S. Application Data on Jul. 30, 2014, provisional application No. 61/994,109, filed on May 15, 2014, provisional application No. 61/950,842, filed on Mar. 11, 2014.

(51) Int. Cl.
*H04W 52/36* (2009.01)
*H04W 72/08* (2009.01)
*H04W 52/38* (2009.01)
*H04W 52/24* (2009.01)
*H04W 52/32* (2009.01)
*H04W 52/10* (2009.01)
*H04W 72/04* (2009.01)
*H04W 8/00* (2009.01)

(52) U.S. Cl.
CPC ....... *H04W 52/325* (2013.01); *H04W 52/367* (2013.01); *H04W 52/383* (2013.01); *H04W 72/0446* (2013.01); *H04W 72/085* (2013.01); *H04W 8/005* (2013.01)

(56) References Cited

U.S. PATENT DOCUMENTS

| | | | | |
|---|---|---|---|---|
| 2013/0107758 A1* | 5/2013 | Waheed | ............ | H04W 52/0219 370/256 |
| 2013/0109301 A1 | 5/2013 | Hakola et al. | | |
| 2014/0003262 A1* | 1/2014 | He | ........................ | H04W 28/08 370/252 |
| 2014/0094213 A1* | 4/2014 | Khoshnevis | ........ | H04W 52/383 455/522 |
| 2014/0112194 A1* | 4/2014 | Novlan | ................. | H04W 8/005 370/254 |
| 2015/0327189 A1* | 11/2015 | Seo | ...................... | H04W 52/383 370/311 |
| 2016/0142898 A1* | 5/2016 | Poitau | .................... | H04W 76/14 370/329 |
| 2016/0165640 A1* | 6/2016 | Yang | ...................... | H04W 74/08 370/336 |

FOREIGN PATENT DOCUMENTS

| | | |
|---|---|---|
| JP | 2015-142356 A | 8/2015 |
| WO | WO 03/069789 A2 | 8/2003 |
| WO | WO 2013/040231 A1 | 3/2013 |
| WO | WO 2014/034573 A1 | 3/2014 |

OTHER PUBLICATIONS

LG Electronics, "Resource Allocation and UE Behavior for D2D Discovery," R1-140337, 3GPP TSG RAN WG1 Meeting #75, Prague, Czech Republic, Feb. 10-14, 2014 (downloaded on Feb. 9, 2014), pp. 1-7.

Qualcomm Incorporated et al., "Direct discovery EPC impacts," S2-140804, SA WG2 Meeting #101bis, San Jose Del Cabo, Mexico, Feb. 17-21, 2014, pp. 1-8.

Usdoc et al., "WF on D2D Communication Resource Allocation," R1-140836, 3GPP TSG RAN WG1 #76, Prague, Czech Republic, Feb. 10-14, 2014, 3 pages.

Alcatel-Lucent Shanghai Bell et al., "D2D discovery channel design", 3GPP TSG RAN WG1 Meeting #76, Feb. 10-14, 2014, R1-140175, 9 pages.

Catt, "Further discussion on resource allocation for D2D discovery", 3GPP TSG RAN WG1 Meeting #76, Feb. 10-14, 2014, R1-140098, 9 pages.

Huawei et al., "Resource allocation for type-1 discovery", 3GPP TSG RAN WG1 Meeting #75, Nov. 11-15, 2013, R1-135046, 3 pages.

* cited by examiner

FIG. 5
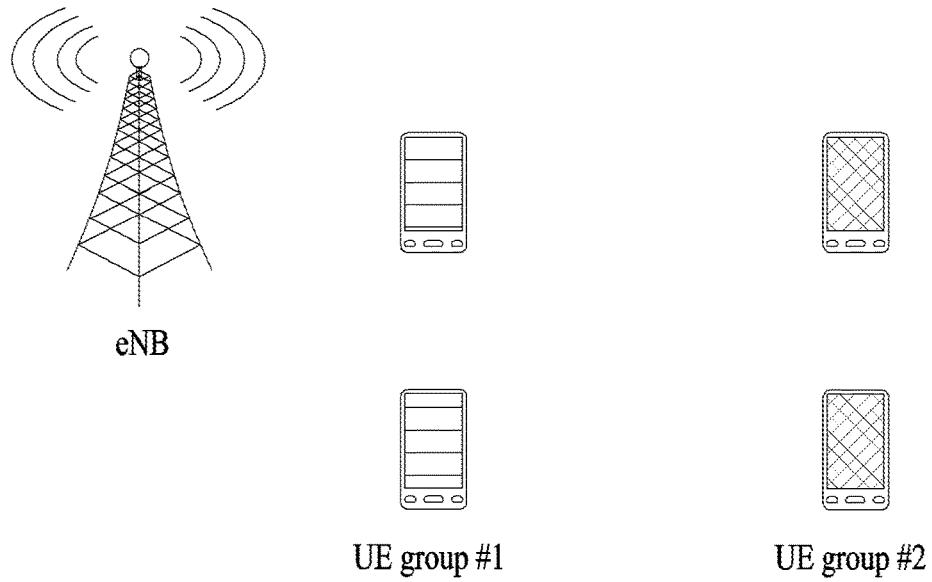
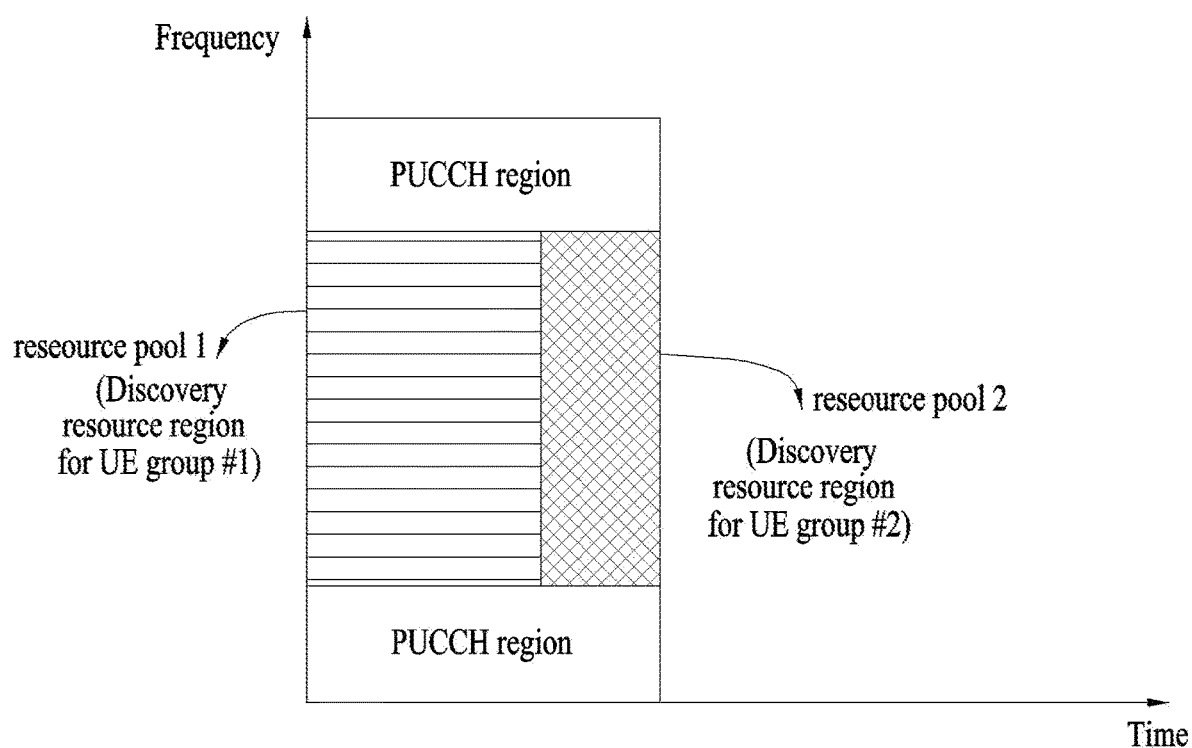

FIG. 6
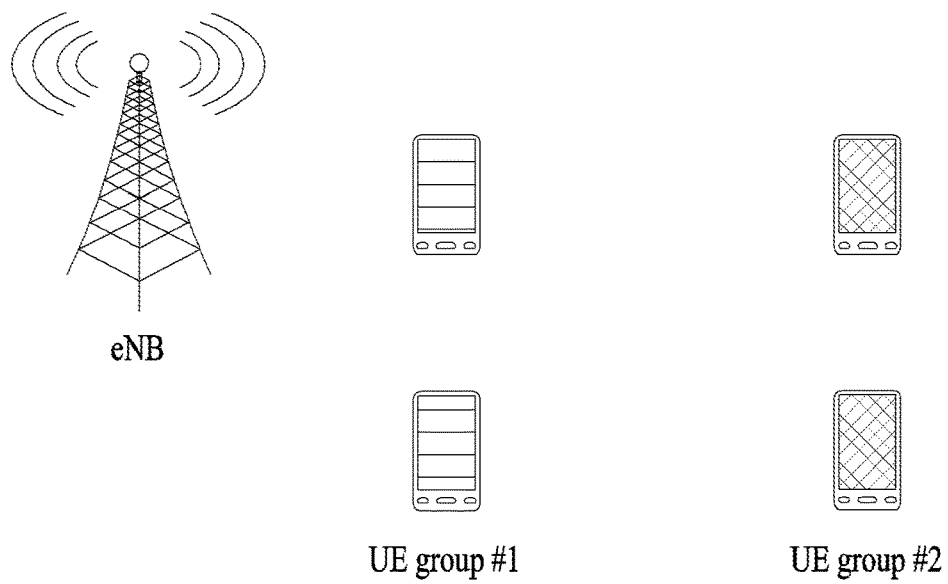
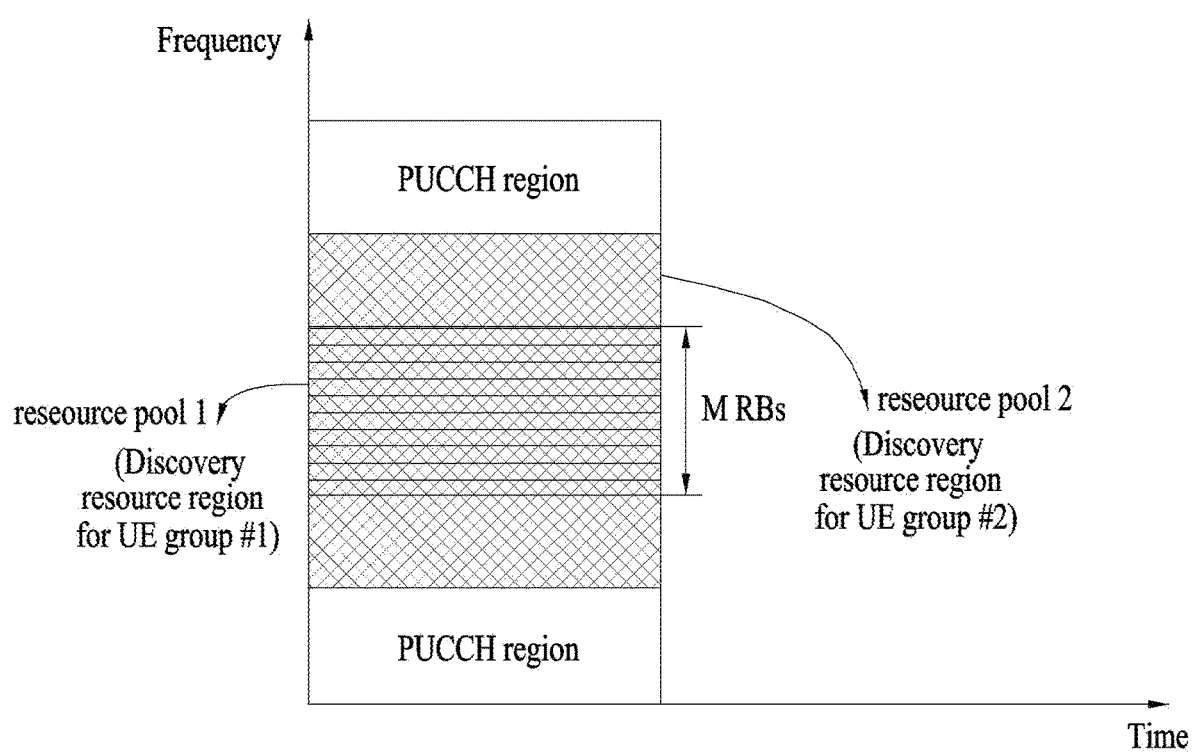

METHOD AND APPARATUS FOR DEVICE-TO-DEVICE USER EQUIPMENT TO TRANSMIT DISCOVERY SIGNAL IN WIRELESS COMMUNICATION SYSTEM

CROSS REFERENCE TO RELATED APPLICATIONS

This application is the National Phase of PCT International Application No. PCT/KR2015/002347, filed on Mar. 11, 2015, which claims priority under 35 U.S.C. 119(e) to U.S. Provisional Application Nos. 61/950,842 filed on Mar. 11, 2014, 61/994,109 filed on May 15, 2014, 62/031,155 filed on Jul. 30, 2014, and 62/033,639 filed on Aug. 5, 2014, all of which are hereby expressly incorporated by reference into the present application.

TECHNICAL FIELD

The present disclosure relates to a wireless communication system and, more particularly, to a method and apparatus for transmitting a discovery signal through device-to-device communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmit power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention devised to solve the problem lies in a method for transmitting a signal in consideration of interference between the WAN signal transmission and D2D signal transmission.

The technical objects that can be achieved through the present invention are not limited to the aforementioned technical object and other technical which are not mentioned herein will be clearly understood by persons skilled in the art from the following detailed description.

Technical Solution

The object of the present invention can be achieved by providing a method for transmitting a discovery signal by a Device-to-Device (D2D) terminal in a wireless communication system, the method including selecting a resource pool from among one or more resource pools, and transmitting a discovery signal using resources of the selected resource pool, wherein the resource pool is selected according to an RSRP measurement result.

In another aspect of the present invention, provided herein is a Device-to-Device (D2D) terminal for transmitting a discovery signal in a wireless communication system, the D2D terminal including a reception module, and a processor, wherein the processor is configured to select a resource pool from among one or more resource pools and to transmit a discovery signal using resources of the selected resource pool, wherein the resource pool is selected according to an RSRP measurement result.

The aspects of the present invention may include some or all of the following details.

An RSRP range may be configured for each of the one or more resource pools.

Open loop power control may be applied to the transmitting of the discovery signal.

$P_0$ and $\alpha$ used in determining a transmit power of the discovery signal may be delivered through a higher layer signaling, wherein $P_0$ may denote a minimum transmit power, and $\alpha$ may denote a path loss coefficient.

Possible values of $\alpha$ may include 0.

A transmit power of the discovery signal may be determined by the following equation:

$$P_{D2D\text{-}Discovery}(i) = \min\left\{ \begin{array}{l} P_{CMAX}(i), \\ P_{0\_D2D\_Discovery} + \alpha \cdot PL + \Delta_{D2D\_Discovery} \end{array} \right\},$$

wherein $P_{0\_D2D\_Discovery}$ may denote a minimum transmit power, PL may denote a path loss, $\Delta_{D2D\_Discovery}$ may denote a power boosting parameter, and $\alpha$ may denote a path loss coefficient.

A size of a resource unit for transmitting the discovery signal may vary according to the RSRP measurement result.

When the D2D terminal is an out-of-coverage terminal, the size of the resource unit for transmitting the discovery signal may be preset by a network operator.

A given number of times of repetition of the discovery signal may be allocated to each of the one or more resource pools.

The number of times of repetition may be determined according to a size of the resource pool in the frequency domain.

A transmit power used in transmitting a physical uplink control channel in a subframe used to transmit the discovery signal may be greater than a transmit power used in transmitting the physical uplink control channel in a subframe unused to transmit the discovery signal.

A parameter related to the transmit power used in transmitting the physical uplink control channel in the subframe used to transmit the discovery signal may be delivered through higher layer signaling.

Advantageous Effects

According to embodiments of the present invention, a discovery signal may be transmitted with minimized influence of interference on PUCCH transmission.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 5 to 7 illustrate resource selection for transmitting a discovery signal according to an embodiment of the present invention.

BEST MODE

Figure 1:
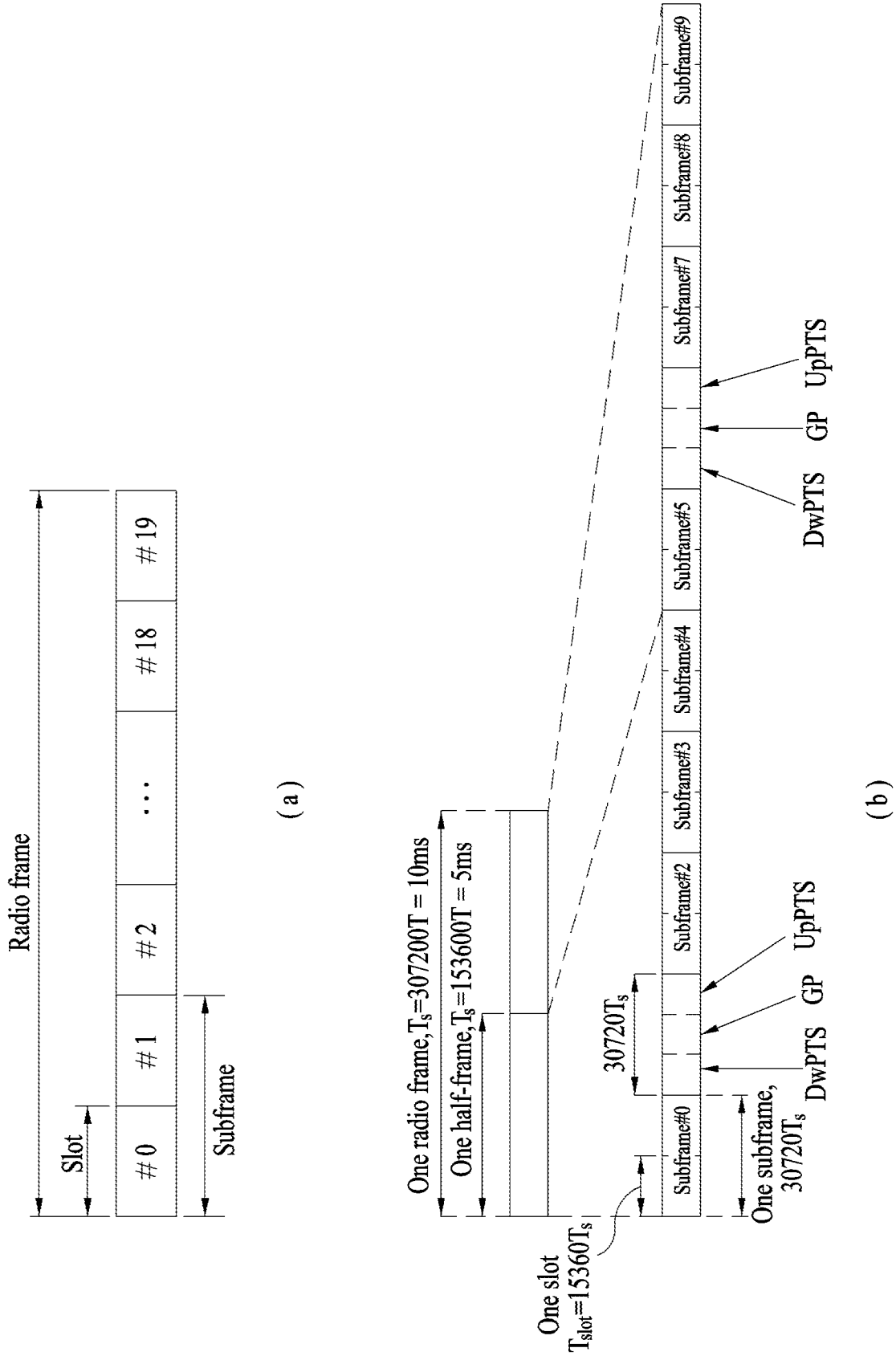
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LIE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LIE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If channel state gets pool, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
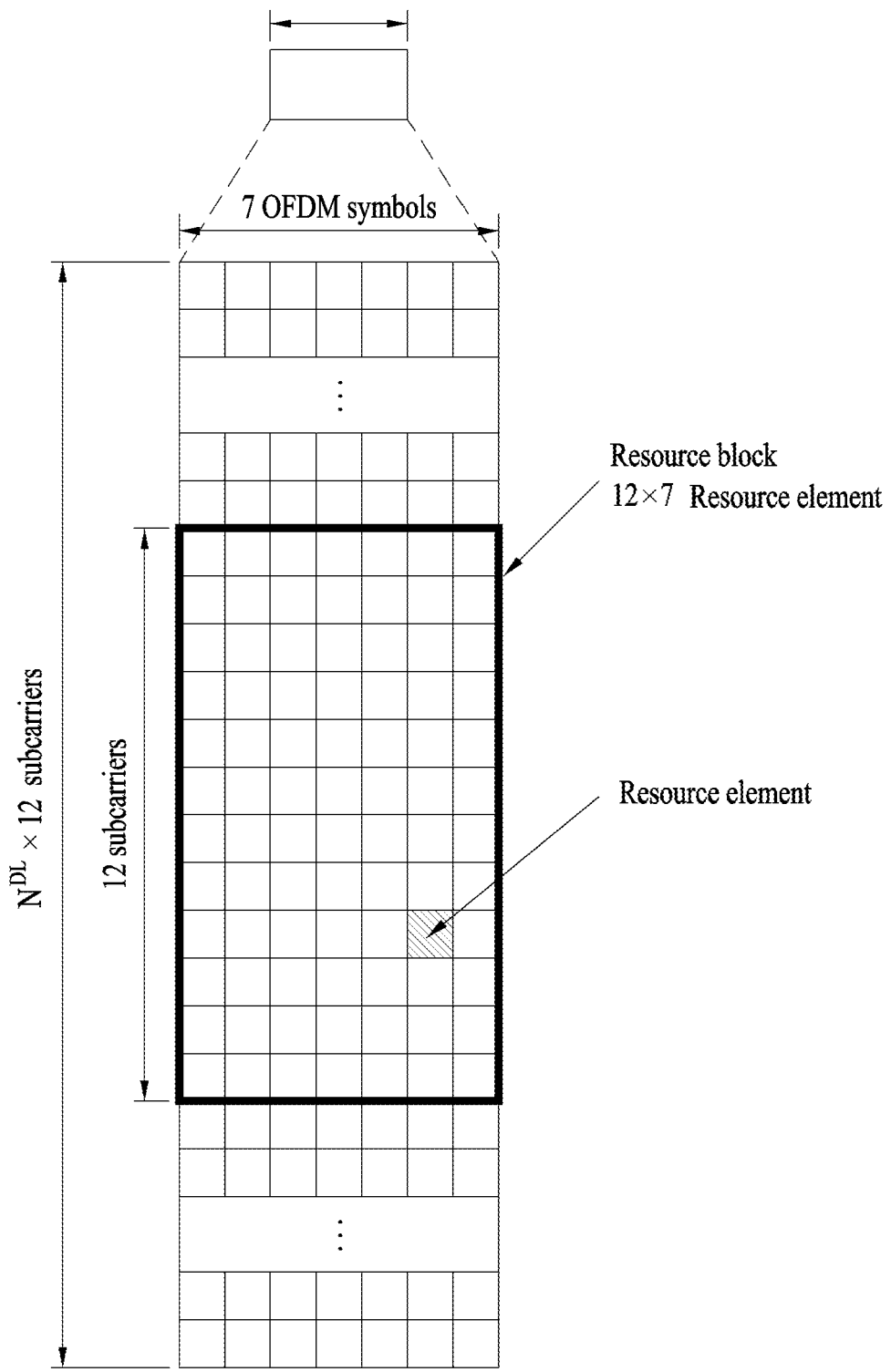
FIG. 2 is a diagram illustrating a resource grid for a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
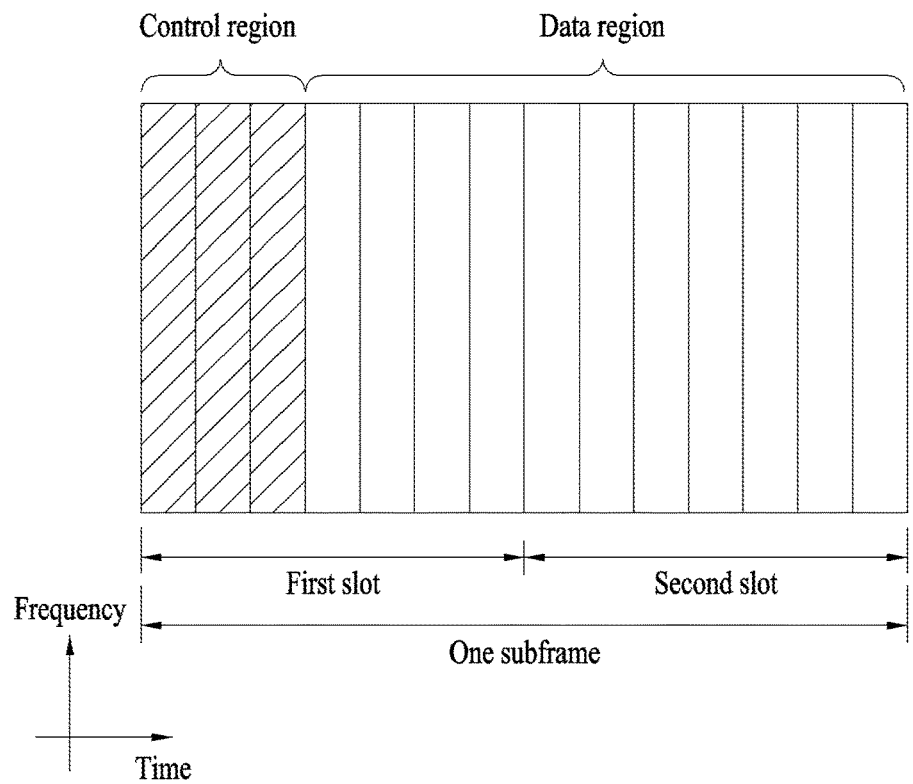
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmit power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmit power control commands for individual UEs of a UE group, transmit power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
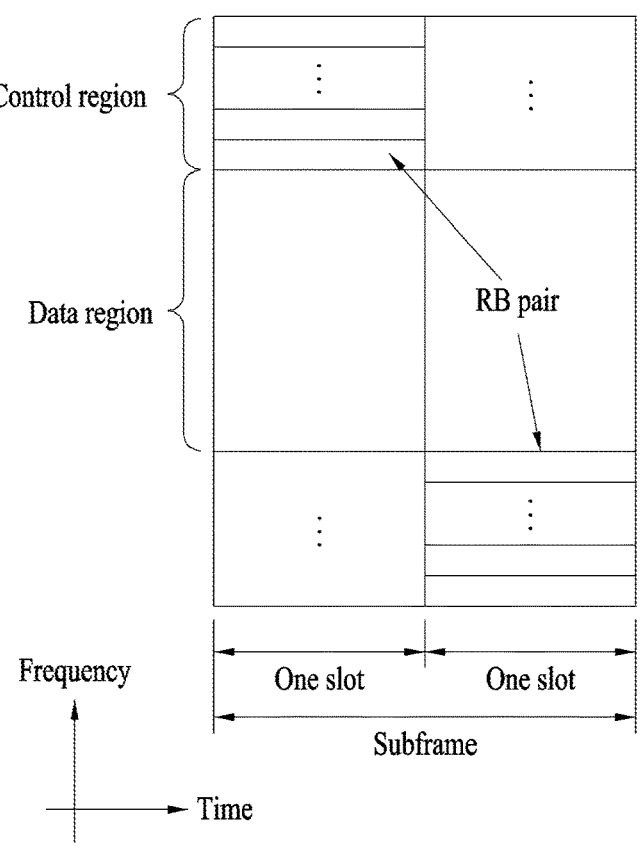
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Uplink Power Control

Uplink power control is applied to the LTE/LTE-A system such that the LTE/LTE-A system may easily demodulate uplink control information, data, etc. The uplink power control may be classified into PUCCH power control, PUSCH power control, and UL Sounding Reference Signal (SRS) power control.

The PUCCH power control is determined considering path loss, maximum transmit power of the UE, and the like, such that control information transmitted on the PUCCH may be demodulated at a sufficiently low error rate.

Specifically, the PUCCH power control in subframe i of cell 'c' may be implemented according to Equation 1 below.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix} \text{ [dBm]}$$
Equation 1

Herein, $P_{CMAX,c}(i)$ denotes a maximum transmit power of the UE, and serves as the upper limit of the PUCCH power control command.

$P_{0\_PUCCH}$ is a PUCCH transmit power value that the eNB desires to receive. This value is transmitted through higher layer signaling as a UE-specific parameter, and is determined to be the sum of nominal power values $P_{O\_NOMINAL\_PUCCH}$ and $P_{O\_UE\_PUCCH}$.

$PL_c$ is a path loss value in cell c, which is estimated by the UE. This value may be estimated by the UE by measuring the receive power of a DL cell-specific reference signal (CRS).

$h(n_{CQI}, n_{HARQ}, n_{SR})$ is a value dependent upon a PUCCH format, $n_{CQI}$ is the number of bits indicating channel quality information, $n_{HARQ}$ is the number of HARQ bits, and $n_{SR}$ is set to 1 if the subframe i is set for request for scheduling and is set to 0 otherwise. $h(n_{CQI}, n_{HARQ}, n_{SR})$ is dependent upon the PUCCH format. Specifically, i) $h(n_{CQI}, n_{HARQ}, n_{SR})$ is set to 0 in the case of PUCCH formats 1, 1a, and 1b, ii) $h(n_{CQI}, n_{HARQ}, n_{SR})$ is set to $$\frac{(n_{HARQ} - 1)}{2}$$

if one or more serving cells are used in PUCCH format 1b, and iii) $h(n_{CQI}, n_{HARQ}, n_{SR})$ is set to $$10\log_{10}\left(\frac{n_{CQI}}{4}\right)$$

if normal cyclic prefix (CP) is used in PUCCH formats 2, 2a and 2b.

$\Delta_{F\_PUCCH}(F)$ is signaled from a higher layer in consideration of MCS. $\Delta_{F\_PUCCH}(F)$ indicates necessity of different signal-to-noise interference ratios (SINR) in response to not only the number of bits per subframe of the PUCCH format but also different error rates.

$\Delta_{TxD}(F')$ is a power offset signaled from a higher layer when the PUCCH is transmitted using two antenna ports, and is dependent upon the PUCCH format.

$g(i)$ is an accumulation value of the current PUCCH power control adjustment states, and is determined by a power value $\delta_{PUCCH}$ corresponding to the value of a transmit power control (TPC) command field included in a DCI format transmitted over a PDCCH and a PUCCH power control adjustment state value $g(i-1)$ of a previous subframe.

Subsequently, PUSCH power control in the case where PUCCH transmission is not performed may be determined by Equation 2.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \text{ [dBm]}$$
Equation 2

$P_{CMAX,c}(i)$ denotes a maximum transmit power of the UE, and $M_{PUSCH,c}(i)$ denotes a PUSCH transmission bandwidth represented by the number of RBs.

$P_{O\_PUSCH,c}(j)$ denotes a PUSCH transmit power value that the eNB desires to receive. This value is determined to be the sum of nominal power values $P_{O\_NOMINAL\_PUSCH}$ and $P_{O\_UE\_PUSCH}$. For semi-persistent scheduling, j is set to 0 (j=0). For dynamic scheduling, j is set to 1 (j=1). For a random access response, j is set to 2 (j=2).

$\alpha_c(j) \cdot PL_c$ is a downlink path loss, where $PL_c$ is estimated by the UE, and $\alpha_c(j)$ is a path loss compensation value transmitted through higher layer signaling. If j=0 or j=1, $\alpha_c \in \{0, 0.4, 0.5, 0.6, 0.7, 0.8, 0.9, 1\}$ is obtained. If j=1, $\alpha_c(j)_{=1}$.

$\Delta_{TF,c}(i)$ is calculated using a value transmitted through higher layer signaling, BPRE (Bit Per Resource Element), CQI, PMI, etc.

$f_c(i)$ is an accumulated value and is determined by a power value $\delta_{PUSCH}$ corresponding to a TPC (transmit power control) command field value included in a DCI format transmitted on PDCCH, the value of $K_{PUSCH}$, which depend upon configuration such as FDD, TDD, or the like, and an accumulated value $f_c(i-1)$ obtained through accumulation up to the previous subframe.

If PUCCH transmission is performed along with PUSCH transmission, the PUSCH power control is expressed by Equation 3 below.

$$P_{PUSCH,c}(i) = \min\begin{Bmatrix} 10\log_{10}(\hat{P}_{CMAX,c}(i) - \hat{P}_{PUCCH}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \text{ [dBm]}$$
Equation 3

$\hat{P}_{CMAX,c}(i)$ has a linear value with respect to $P_{CMAX,c}(i)$, and $\hat{P}_{PUCCH}(i)$ is a linear value for PUCCH power control determined by Equation 3. The remaining parameters have meanings as disclosed above.

Acquisition of Synchronization between D2D UEs

Hereinafter, description will be given of acquisition of synchronization between UEs in D2D communication based on the above description and the legacy LTE/LTE-A system. If time/frequency synchronization is not obtained in the OFDM system, OFDM signals may not be multiplexed between different UEs due to inter-cell interference. It is inefficient for all D2D UEs to individually match synchronization by directly transmitting and receiving a synchronization signal. Accordingly, in a distributed node system such as the D2D system, a specific node may transmit a representative synchronization signal, and the other UEs may match synchronization therewith. In other words, to perform transmission and reception of a D2D signal, some nodes (which may be referred to as eNBs, UEs, SRNs (synchronization reference nodes) or synchronization sources) may transmit a D2D synchronization signal (D2DSS), and the other UEs may transmit or receive a signal in synchronization therewith.

The D2DSSs may include a primary D2DSS (PD2DSS) and a secondary D2DSS (SD2DSS). The PD2DSS may have a similar/modified/repeated structure of a Zadoff-Chu sequence having a predetermined length or a PSS. The SD2DSS may have a similar/modified/repeated structure of an M-sequence or an SSS. When UEs are synchronized with an eNB, the eNB serves as an SRN, the PSS/SSS serves as a D2DSS. The physical D2D synchronization channel (PD2DSCH) may be a (broadcast) channel on which basic (system) information (e.g., information related to the D2DSS, the duplex mode (DM), TDD UL/DL configuration, resource pool-related information, the type of an application related to the D2DSS, etc.) which a UE needs to check before transmitting and receiving a D2D signal is transmitted. The PD2DSCH may be transmitted in the subframe in which the D2DSS is transmitted or in a subsequent subframe.

The SRN may be a node to transmit the D2DSS and physical D2D synchronization channel (PD2DSCH). The D2DSS may take the form of a specific sequence, and the PD2DSCH may take the form of a sequence representing specific information or a codeword obtained through predetermined channel coding. Herein, the SRN may be an eNB or a specific D2D UE. When the UE is within a partial network coverage or out of network coverage, the UE may serve as an SRN. In the case of inter-cell discovery, the UE may relay a D2DSS a certain offset after the timing of reception of the D2DSS from the SRN in order to make inter-cell UEs recognize timing. That is, The D2DSS may be relayed through multiple hops. If multiple UEs relay the D2DSS or there are multiple clusters around the UE, the UE to receive a D2DSS may observe multiple D2DSSs and receive D2DSSs having different hops.

Discovery Signal Transmission and PUCCH Transmission

In D2D communication, discovery signal transmission for discovery between UEs may be divided into the following two types. Type 1 discovery signal transmission is discovery signal transmission performed when allocation of discovery signal transmission resources is not UE-specific, and type 2 discovery signal transmission is signal transmission performed when allocation of discovery signal transmission resources is UE-specific. In type 1 discovery signal transmission, the network may configure only the resource region in which a discovery signal is transmitted, and the UE may determine resources in the resource region (based on any, random or energy sensing) to transmit the discovery signal. Herein, the resource region in which the discovery signal is transmitted may not overlap the PUCCH resource region. More specifically, PUCCH resources may be excluded from the resource region for discovery signal transmission because the PUCCH resources are used by legacy UEs to transmit ACK/NACK or CSI. In addition, power control may be applied to PUCCH transmission. Accordingly, in performing discovery signal transmission, PUCCH transmission may undergo severe interference due to, for example, inband emission. In this regard, methods to protect both discovery signal transmission and PUCCH transmission will be discussed below. In the following disclosure, a relationship between discovery signal transmission and PUCCH transmission will be mainly described, but it should be noted that the present invention is not limited thereto. The present invention is also applicable to a relationship between transmission of a D2D signal different from the discovery signal and transmission of a WAN signal.

Open Loop Power Control

In performing discovery signal transmission, PUCCH transmission may be protected through transmit power control. Herein, the transmit power control which is suitable for the operation in terms of nature of discovery signal transmission would be open loop power control (Closed loop power control may be adopted depending on the D2D signal type). That is, when the UE transmits a discovery signal, the transmit power may be given by Equation 4 below.

$$P_{D2D\_Discovery}(i) = \min\left\{ \begin{array}{l} P_{CMAX}(i), \\ P_{0\_D2D\_Discovery} + \alpha \cdot PL + \Delta_{D2D\_Discovery} \end{array} \right\}$$

Equation 4

In this equation, $P_{0\_D2D\_Discovery}$ denotes the minimum transmit power, PL denotes path loss, $\Delta_{D2D\_Discovery}$ is a power boosting parameter (power offset, power offset parameter), and $\alpha$ is a path loss coefficient ($0=<\alpha=<1$, where $\alpha$ is 1 for PUCCH). Herein, $P_{0\_D2D\_Discovery}$, $\alpha$ and $\Delta_{D2D\_Discovery}$ may have values pre-signaled to the UE or preset/preconfigured values. That is, $P_{0\_D2D\_Discovery}$ and $\alpha$ may be signaled to the UE through higher layer signaling (e.g., RRC signaling), broadcasting or physical layer signaling (system information block, PDCCH, EPDCCH, or the like). Parameters related to the power control may also be signaled using the method described above. The backoff parameter $\Delta_{D2D\_Discovery}$ is an offset introduced to transmit a D2D signal at a lower (or higher) power in case that $P_{0\_D2D\_Discovery}$ reuses the value of another cellular channel. The maximum D2D transmit power may be set to a value separate from existing $P_{CMAX}$.

Parameters which are not signaled among the aforementioned parameters may be preset to specific values, reuse the values signaled for cellular use, or have values which are delivered through separate signaling for D2D during reuse of the values signaled for cellular use. For example, $P_{0\_D2D\_Discovery}$ and $\alpha$ may be set to the values of the legacy PUSCH or PUCCH and thus may not be separately signaled. Instead, $\Delta_{D2D\_Discovery}$ may be signaled for D2D.

Adjustment of the power for discovery signal transmission may be implemented as stepwise transmit power adjustment. For example, if the signal strength (RSRP, RSRQ) from the eNB is lower than or equal to a preset threshold, the signal may be transmitted at a preset transmit power X dBm. If the signal strength is greater than the threshold, the signal may be transmitted at Y dBm. Y may be set to be less than X. Such stepwise transmit power setting is not limited to the 2 steps. The transmit power setting may be generalized as setting M transmit power values. In this case, the threshold for the signal strength from the eNB and the transmit power within the threshold range may have preset values or be signaled from the eNB to the UE through a physical layer signal or higher layer signal.

Determination of Transmission Resources According to Signal Intensity from the eNB The region for transmission of a discovery signal may be separately configured according to the signal strength of the eNB (which may be RSRP, RSRQ or a value related to the strength the received signal from the eNB). Specifically, one or more resource pools for transmission of discovery signals may be configured, and the range of RSRP (or a value related to the received signal strength such as RSRQ) may be configured for each of the resource pools. Thereby, a specific D2D UE may select a resource pool in the range including RSRP, and transmit a discovery signal using a resource for discovery signal transmission in the resource pool (wherein the resource may be randomly selected in the resource pool). That is, a UE having type 1 discovery configured therefor may select a resource pool from among one or more resource pools, and transmit the discovery signal using a resource in the selected resource pool. Herein, the resource pool is selected based on the RSRP measurement result. Examples of this operation are illustrated in FIGS. 5 and 6. Referring to FIG. 5, two resource pools are configured for a discovery signal. And an RSRP range is configured for each of the two resource pools. For example, resource pool 1 may be for an RSRP range between −110 and −80, and resource pool 2 may be for an RSRP range between −80 and −60. UEs (e.g., UEs belonging to UE growth #1) which are at similar distances from the eNB and have RSRPs similar to each other may transmit discovery signals using resources in the same resource pool. While FIG. 5 illustrates configuring resource pools according to a TDM scheme, multiple resource pools may be configured according to FDM as illustrated in FIG. 6 or a combination of TDM and FDM, which is not shown.

Such configuration may allow UEs having the same repetition factor (or the same unit size) to perform transmission in similar resource regions, thereby simplifying design of a hopping pattern. In addition, this configuration allows UEs close to each other or having similar transit powers to perform transmission (simultaneously) on the same resource in consideration of inband emission, thereby attenuating degradation of performance caused by inband emission. For example, when two UEs are far away from each other, it may be impossible for the receiving UE to receive a signal from the UE which is far away therefrom due to inband emission of a specific UE close thereto. In this case, the UEs may be configured to perform transmission simultaneously, thereby alleviating the above phenomenon.

The operation of distinguishing between resource pools according to the RSRP may be extended to distinguish transmission resource regions according to the magnitude of the transmit power regardless of the RSRP. For example, if UEs of a specific group transmit (are capable of transmitting) discovery signals at a high transmit power, the time resource region of the UEs of the specific group may be configured to be different from that of a UE having low transmit power. The discovery signal transmission resource region (resource pool) according to the signal strength (or transmit power) of the eNB may be pre-configured or delivered by the network through physical layer signaling (SIB, PDCCH/EPDCCH, etc.) or higher layer signaling (RRC signaling). For example, the network may deliver configuration of multiple resource pools and the transmit power for each of the resource pools to the UE through physical layer signaling or higher layer signaling. The UE may select a resource pool according to a target discovery range (a target communication range for communication signals), and transmit a discovery signal at the transmit power which is set for the selected resource pool.

As described above, selection of a resource pool according to the RSRP or transmit power may be used together with embodiments which will be described below. For example, transmission may be performed at transmit power P_A dBm N_A times in resource pool A, and may be performed at transmit power P_B dBm N_B times in resource pool B. in this case, the number of times of repetition in each resource pool may be signaled by the network through a physical layer signal or higher layer signal. The number of times of repetition/unit size according to each resource region may be preset, or signaled to the UE by the network through a physical layer signal or higher layer signal. This configuration may ensure the operation of smooth multiplexing of UEs which have different numbers of times of repetition/unit sizes and prevent unnecessary blind decoding in the receiving UE. If it is determined that a UE is out of coverage, the UE may transmit the D2D signal at a predetermined transmit power in a predetermined resource region a predetermined number of times of repetition.

Differently setting the transmit power and/or the number of times of repetition for each resource pool may be configured each step of a target range. For example, if a discovery range of 3 steps (short/medium/long) is configured, the resource region may be divided into 3 regions, and different transmit powers and/or numbers of times of repetition may be set for the respective regions to distinguish between the ranges. Each UE selects a resource according to a target range of an application or service, and transmits a D2D signal at the transmit power/the number of times of repetition set for the resource. For D2D communication, the number of times of repetition in each resource pool may be predetermined according to a target range or configured through a higher layer signal, and a D2D signal transmitting UE may transmit a D2D communication packet by setting the number of times of repetition and transmit power according to the target range. To simplify multiplexing between the UEs having different numbers of times of repetition, the transmission resource pools may be distinguished from each other according to the numbers of times of repetition. Similar to discovery, the transmit power and the number of times of repetition for each D2D resource pool may be predetermined or signaled through a higher layer signal. Herein, the number of times of repetition may be the maximum, minimum or average number of times of repetition in the corresponding resource pool. Similar to D2D communication, the transmit power and/or the number of times of repetition may be predetermined according to the scheduling assignment (SA) pool or target range, or signaled to the UE through a physical layer signal or higher layer signal.

Determination of the Number of Times of Repetition According to the Signal Strength from the eNB The number of times of repetition of transmission of a discovery signal may be determined according to the signal strength (RSRP, etc.) from the eNB. Herein, the number of times of repetition may refer to the number of times of repetition within one period of a discovery resource or the maximum possible number of times of transmission within a predetermined time. For example, the number of times of repetition of transmission of a discovery signal may be set to M if the RSRP is greater than or equal to a threshold, and set to N if the RSRP is less than the threshold. Herein, as the RSRP increases (namely, the distance from the eNB decreases), the set transmit power of a discovery signal decreases. Accordingly, M may be set to be greater than N to compensate for loss of coverage according to the transmit power through repetition of transmission. More generally speaking, the number of times of repetition of transmission of a discovery signal may be preset according to the RSRP as shown in Table 1 below.

TABLE 1

| RSRP (R) | Repetition number of discovery signal |
|---|---|
| R < P1 | M1 |
| P1 < R < P2 | M2 |
| ... | ... |
| PT-1 < R < PT | MT |

The number of times of repetition according to the signal strength (or transmit power) of the eNB may be pre-configured or delivered by the network through physical layer signaling (such as SIB and PDCCH/EPDCCH) or higher layer signaling (RRC signaling). For a UE which is out of coverage, the network operator may operate according to a preset value. If configurations as shown in Table 1 are signaled to the UE, the threshold value for each boundary and the number of times of repetition for each region may be carried by a physical layer signal or higher layer signal.

The configurations described above may address an issue (difference in performance between a UE at a cell boundary and a UE at the center of a cell) which may be raised in performing open loop power control to protect PUCCH transmission.

Configuring a Discovery Unit According to the Signal Strength from the eNB

The aforementioned operation of setting the number of times of repetition according to the strength of a signal of the eNB may also be implemented by increasing (or decreasing) the size of a discovery signal unit. That is, the size of a discovery unit may be set according to the signal strength from the eNB. For example, if the signal strength of the eNB is greater than or equal to P, 2 RBs×2 SFs may be set as one discovery signal unit. If the signal strength of the eNB is less than P, 2RBs×1 SF may be set as one discovery signal unit. The size of one discovery signal unit may be determined with the number of SFs in the time domain and the number of RBs in the frequency domain. The discovery signal unit size according to the RSRP may be pre-configured, or be delivered by the network through physical layer signaling (such as SIB and PDCCH/EPDCCH) or higher layer signaling (RRC signaling). For a UE which is out of coverage, the network operator may operate according to a preset value.

The number of times of repetition (or unit size) in a resource pool may be determined by the frequency (and/or time) resources size of the resource pool or the system bandwidth. For example, if the number of system bandwidth is greater than or equal to a certain number of RBs, the number of times of repetition (or unit size) may be set to A. If the number of system bandwidth is less than the certain number of RBs, the number of times of repetition (or unit size) may be set to B. This method is intended to multiplex D2D signals of more UEs or lower interference according to repetition by reducing the number of times of repetition in the first place because sufficient frequency (and/or time) diversity cannot be obtained if the frequency resource size is small. On the other hand, if the resource pool size or system bandwidth is greater than or equal to a certain threshold, more repetitions may be allowed to secure a wider D2D range because it is expected that there will be sufficient resources and collision is less likely to occur. To generalize, the number of times of repetition (unit size) according to the resource pool size (or system bandwidth) may be predetermined as a step. For example, the frequency size (or the system bandwidth size) of a D2D resource pool may be divided into N steps, and the number of times of repetition (or unit size) for each step may be predetermined. As another method, the number of times of repetition may be determined according to the unit size (PRB size) or information bit size of the D2D signal. For example, the number of times of repetition may be set to a if the unit size is A PRB pairs, and may be set to b if the unit size is B PRB pairs. As another example, the number of times of repetition may be set to c if the information bit size is greater than or equal to a certain size, and may be set to d if the information bit size is less than the certain size. This method is intended to secure a certain coding rate or obtain an energy gain by increasing the number of times of repetition when the unit size of the D2D signal is set to be small. If the unit size is set to be greater than or equal to a certain size, repetition may not be set or the number of times of repetition may be reduced to prevent the resources from being unnecessarily wasted because a sufficient coding gain can be obtained. In the case where the unit size of the D2D signal is fixed, if the information bit size is excessively large, sufficient D2D coverage cannot be secured because a sufficient coding rate cannot be secured. In this case, the number of times of repetition may be increased to obtain an energy gain or reduce an effective coding rate. The number of times of repetition (or unit size) according to the resource size (or system bandwidth), D2D signal unit size or information bit size may be set for scheduling assignment (SA), type 1 discovery, and type 2 discovery, separately, and some numbers of times of repetition may be set to values signaled by the network. For example, when it is assumed that type 1 discovery and type 2 discovery operate only within the network, the numbers of times of repetition (or unit sizes) for the respective resource pools for the two D2D signals may not be predetermined, but may always be set to values configured by the network. However, for SA, if a UE which is out of coverage transmits a D2D communication packet, a preset number of times of repetition (or unit size) may be needed. In this case, the number of times of repetition (or unit size) which is preset by the system bandwidth may be used. The preset number of times of repetition (or unit size) may be predetermined according to the size of the resource pool (or system bandwidth), and if the network indicates the number of times of repetition (or unit size) through a higher layer signal, operation may be performed according to the indicated number of times of repetition (or unit size). Alternatively, if the number of times of repetition is indicated by another UE through a PD2DSCH or a D2D signal of a higher layer (or a physical layer other than the PD2DSCH) in a partial network coverage, a rule may be defined such that the indicated number of times of repetition (or unit size) is used.

The configurations described above may address an issue (difference in performance between a UE at a cell boundary and a UE at the center of a cell) which may be raised in performing open loop power control to protect PUCCH transmission.

Restriction on the Frequency Resource Region

Figure 7:
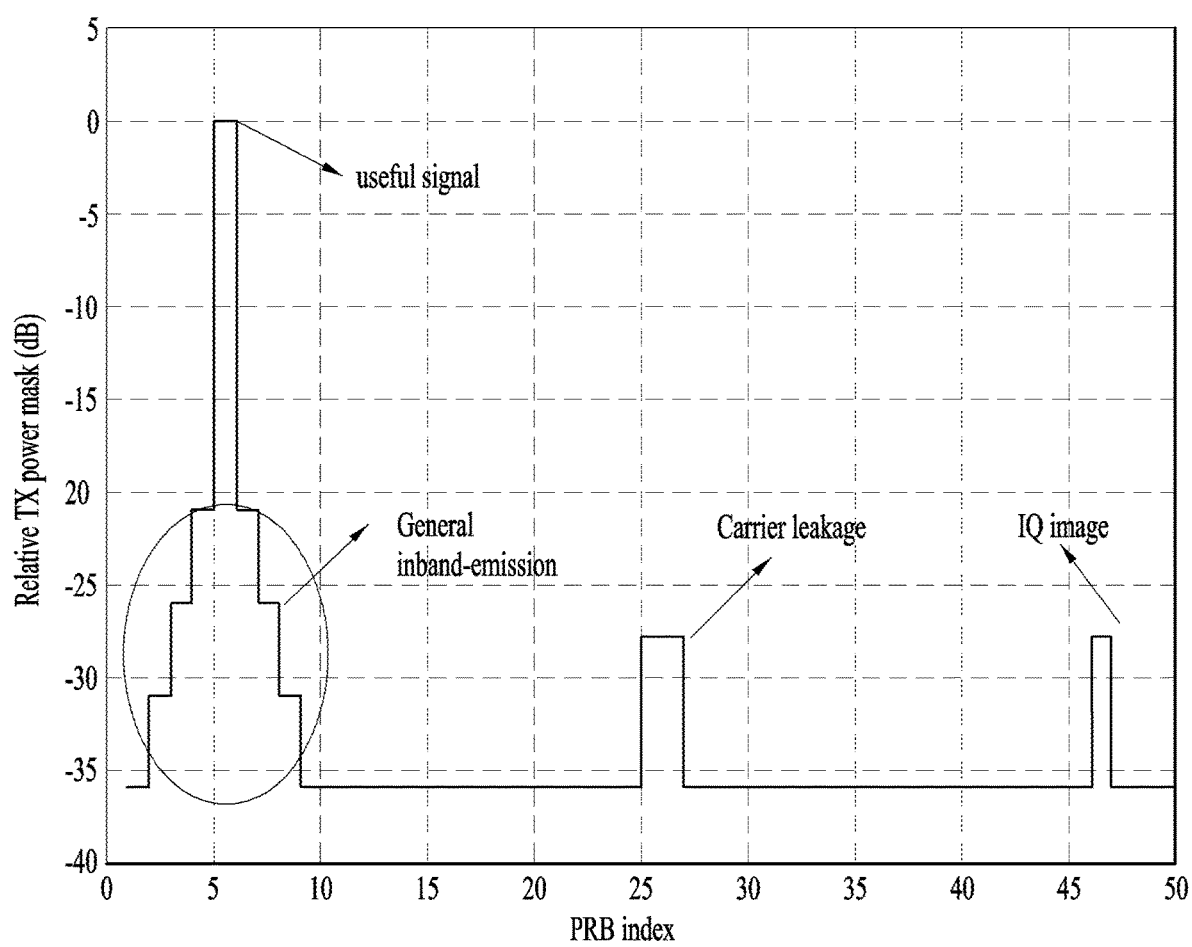

As another method to lower interference applied to PUCCH transmission in discovery signal transmission, the frequency resource region may be restricted. If a UE close to the eNB transmits a discovery signal using a resource near a PUCCH resource, severe interference may be applied to the PUCCH region due to inband emission (particularly, EVM-shoulder determined according to the EVM requirement) of the signal. Referring to FIG. 7, if the region indicated by a circle overlaps the PUCCH region (the region next to the region for a useful signal overlaps the PUCCH resources), severe interference may be applied to the PUCCH. Accordingly, the resource region for the discovery signal may be restricted in the frequency domain to prevent resources around the PUCCH resources from being used for D2D discovery signal transmission. Restriction on transmission in the frequency resource region (or available frequency region) may be selectively applied according to the signal strength (RSRP or RSRQ) of the eNB, and the threshold value of the signal strength of the eNB and the restricted transmission region (or available frequency region) which are necessary for the selected application may be pre-indicated to the UE through a higher layer signal (e.g., RRC) or physical layer signal (e.g., (E)PDCCH or SIB).

As a specific example, referring to FIG. 6, UEs (of UE group #1) having RSRP greater than or equal to a predetermined value may be restricted not to use resource pool 2. This operation may be understood as defining the mapping relationship between the resource pools and RSRP in the previous embodiment in which resource pools are respectively configured for each RSRP. That is, the resource pools may be configured for respective RSRPs in a manner that as the RSRP increases, the corresponding resource pool moves away from the PUCCH region. That is, in FIG. 6, the available resource regions for UE group #1 and UE group #2 are configured to be separated from each other in the frequency domain. The available resource region according to the received signal strength (RSRP or RSRQ) from the eNB may be pre-configured or be indicated to the UE through a higher layer signal (e.g., RRC signal) or physical layer signal (e.g., (E)PDCCH or SIB).

The aforementioned method of distinguishing between the frequency resource regions according to the signal strengths from the eNB may also be implemented by distinguishing between the frequency resources according to the transmit powers of UEs. For example, a UE having a transmit power greater than or equal to a dBm (or having the maximum transmit power of X dBm) may transmit a D2D signal in the resource region for UE group #1 of FIG. 6, and a UE having a transmit power less than or equal to a dBm (or having the maximum transmit power of Y dBm) may use the resource region for UE group #2. To implement this operation, the transmit power, the range of transmit power or the representative value of transmit power for indicating the range of transmit power may be predefined or signaled to the UE through a physical layer signal or a highly signal for each resource region.

Separation of the frequency regions described above may also be implemented by changing the transmission probability rather than by explicitly distinguishing between the resource regions. For example, the UE having a received signal strength from the eNB which is greater than or equal to a threshold may set the transmission probability of a discovery signal by reducing the average value or preset value by a certain offset (>0) in areas near the PUCCH region. By setting different transmission probabilities for the respective frequency regions to protect the PUCCH resources, a UE near the eNB may be almost prevented from performing signal transmission on RBs near the PUCCH resources. The transmission probabilities for RBs in the frequency domain may be a function of received signal strengths of the eNB. The transmission probability on an RB near the PUCCH resources may be changed in inverse proportion to the strength of the received signal of the eNB. This adjustment of transmission probabilities for respective RBs in the frequency domain may also be implemented by applying an offset with respect to an average transmission probability. In this case, the offset value may be set to increase on an RB near the PUCCH resource as the signal strength of the eNB decreases, and to decrease on an RB near the PUCCH resource as the signal strength of the eNB increases. As another example, a specific offset for the transmission probabilities may be configured for (pre-configured for or signaled, through a higher layer signal such as an RRC signal, to) the UE, and whether or not to use the offset may be determined according to the received signal strength from the eNB.

Setting Different Transmit Powers for Frequency Positions

As an example configured by loosening the restriction on the frequency resource region, the discovery transmit power may be restricted while use of resources near the PUCCH resource are allowed even if the RSRP is greater than or equal to a threshold value. That is, in FIG. 6, UEs of UE group #1 are allowed to select resource for 2, and transmit power is restricted if a discovery signal is transmitted in resource pool 2. In this case, the maximum transmit power may be restricted, or the minimum transmit power $P_{0\_D2D\_Discovery}$ may be set differently for the respective frequency resources. For example, UEs of UE group #2 of FIG. 6 may be configured to perform transmission at a power less than or equal to a threshold on the resources near the PUCCH resource region, or $P_{0\_D2D\_Discovery}$ may be set to have a lower value near the PUCCH region than in the other regions. The maximum transmit power for each frequency region may be defined as a function of the received signal strength from the eNB. For example, the maximum transmit power on resources near the PUCCH region may be set to change in inverse proportion to the received signal strength from the eNB.

PUCCH Power Control

The descriptions given above relate to methods for imposing restrictions on a discovery signal (e.g., selection of a resource pool, determination of a frequency region, transmit power control) in terms of the relationship between discovery signal transmission and PUCCH transmission. In contrast, alleviation of interference may be achieved in terms of PUCCH power control. That is, PUCCH power control may be set to be different from power control in a subframe which has no relation to discovery signal transmission in a region in which a discovery signal is expected to be transmitted. In other words, a transmit power used for PUCCH transmission in a subframe in which a discovery signal is transmitted may be set to be greater than a transmit power used for PUCCH transmission in a subframe in which the discovery signal is not transmitted.

Specifically, PUCCH power control according to an embodiment may be implemented by Equation 5.

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix} \text{ [dBm]}$$ Equation 5

$P_{O\_PUCCH}$ is set to a value indicated by a higher layer. In this embodiment, separate $P_{O\_PUCCH}$ may be indicated through a higher layer signal (e.g., RRC signal) such that a different transmit power is used in a subframe (SF) in which a discovery signal is transmitted. Herein, $P_{O\_PUCCH}$ may be divided into $P_{UE\_PUCCH}$ and $P_{O\_NOMINAL\_PUCCH}$, and only $P_{UE\_PUCCH}$ may be indicated through separate higher layer signaling (e.g., RRC signaling) to boost power only for UEs transmitting PUCCHs in an SF in which the discovery signal is transmitted. As another method, a predetermined offset may be applied to $P_{UE\_PUCCH}$, and indicated through a higher layer signal. In the equation above, the other variables are already described in the section related to UL power control, and thus other description thereof will be omitted.

By boosting the PUCCH transmit power, uniqueness of transmission of a discovery signal may be reflected. More specifically, if a UE in the RRC idle mode can transmit a discovery signal, a UE to transmit a discovery signal transmits the signal at timing different from the existing transmission timing for the uplink signal as it is not aware of timing advance (TA). This may cause the eNB to lose orthogonality with the uplink signal. Thereby, high interference is likely to be observed due to ICI in the subframe in which the discovery signal is transmitted. In this case, stable PUCCH transmission may be implemented by boosting the PUCCH transmit power.

SRS Power Control

In the same context, power of the SRS may also be boosted in an SF in which the discovery signal is transmitted, compared to the conventional operation. If an SRS is transmitted in an SF in which the discovery signal is transmitted higher interference may be applied than in other SFs, and accordingly the network may instruct the SRS to be transmitted at a higher power in the SF. The existing SRS power control is given by Equation 6.

$$P_{SRS,c}(i) = \min \{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \text{[dBm]}$$ Equation 6

$P_{O\_PUSCH,c}$ and $\alpha_c$ have values indicated by a higher layer. If an SRS is transmitted in an SF in which the discovery signal is transmitted, a value different from the value given in SFs in which the discovery signal is not transmitted may be indicated by the network. This value may be indicated to the UE through higher layer signaling (e.g., RRC signaling). Herein, $P_{O\_PUSCH,c}$ may be divided into $P_{UE\_PUCCH,\ c}$ and $P_{O\_NOMINAL\_PUCCH,C}$ and indicated. To apply SRS power boosting only to the UE that transmits an SRS in an SF in which the discovery signal is transmitted, only $P_{UE\_PUCCH,\ c}$ may be signaled to the UE through a separate higher layer signal. In addition, if an SRS is transmitted in an SF in which the discovery signal is transmitted, $P_{SRS\_OFFSET,\ c}$ may be indicated through separate higher layer signaling (e.g., RRC signaling).

If the discovery signal is hardly transmitted, the PUCCH and SRS power control described above, which is performed to additionally apply a transmit power on the assumption that the discovery signal is transmitted, may become unnecessary or severely degrade the reception quality of the discovery signal due to power boosting of the PUCCH and SRS. To address this issue, PUCCH and/or SRS power boosting may be optionally employed only when the discovery signal greater than or equal to a certain threshold value is observed. For example, a UE to transmit a PUCCH or SRS may be pre-configured to observe a discovery signal in a certain window (e.g., performs energy sensing in a region in which the discovery signal is transmitted (or in the PUSCH region) before transmitting the PUCCH or SRS and to optionally perform power boosting only when the signal or receive power which is greater than or equal to a certain threshold is observed.

A combination of one or more of the methods for lowering interference between the D2D signal (e.g., discovery signal) and the PUCCH signal described above may be used. For example, the eNB may select a discovery resource pool according to the signal strength, and the transmit power for PUCCH transmission in an SF in which the discovery signal is transmitted may be set to be greater than the transmit power in an SF in which the discovery signal is not transmitted. As another example, a method for identifying power control and resources (configuration of resource pools for respective RSRPs, restriction on the frequency resource region, or the like) according to the signal strength of the eNB may be used as well.

The aforementioned method may be selectively used according to whether or not a CP length is configured. If the same CP is configured for a cellular signal and a discovery signal, influence of the inband emission is considered. However, if different CPs are configured for the cellular signal and discovery signal, not only the inband emission but also ICI according to loss of orthogonality should be considered. Accordingly, if the wide-area network (WAN) signal (e.g., cellular signal) and the discovery signal have the same CP length, only the restriction on the available frequency region is employed. If different CP lengths are used, however, PUCCH power control and SRS power control may be employed in addition to the restriction on the available frequency region.

The proposed methods are not limited to transmission of a discovery signal. Some of the proposed methods may be selectively used when a D2D communication signal, a scheduling allocation signal for communication or a D2D synchronization signal is transmitted. Herein, scheduling allocation refers to a control signal including a transmission resource position and ID of a D2D communication packet prior to transmission of the D2D communication packet. In addition, for the power control, when different D2D transmission signal are given, the same power control parameter may be used, or different parameters (e.g., P0, alpha, power offset, and the like) may be separately configured/signaled for the respective signals.

For example, closed-loop power control may be used for transmission of a D2D communication signal in an operation mode operated under control of the eNB, and some of the proposed methods may be used in a mode operated in a situation where D2D communication signals are not individually controlled by the eNB.

Figure 8:
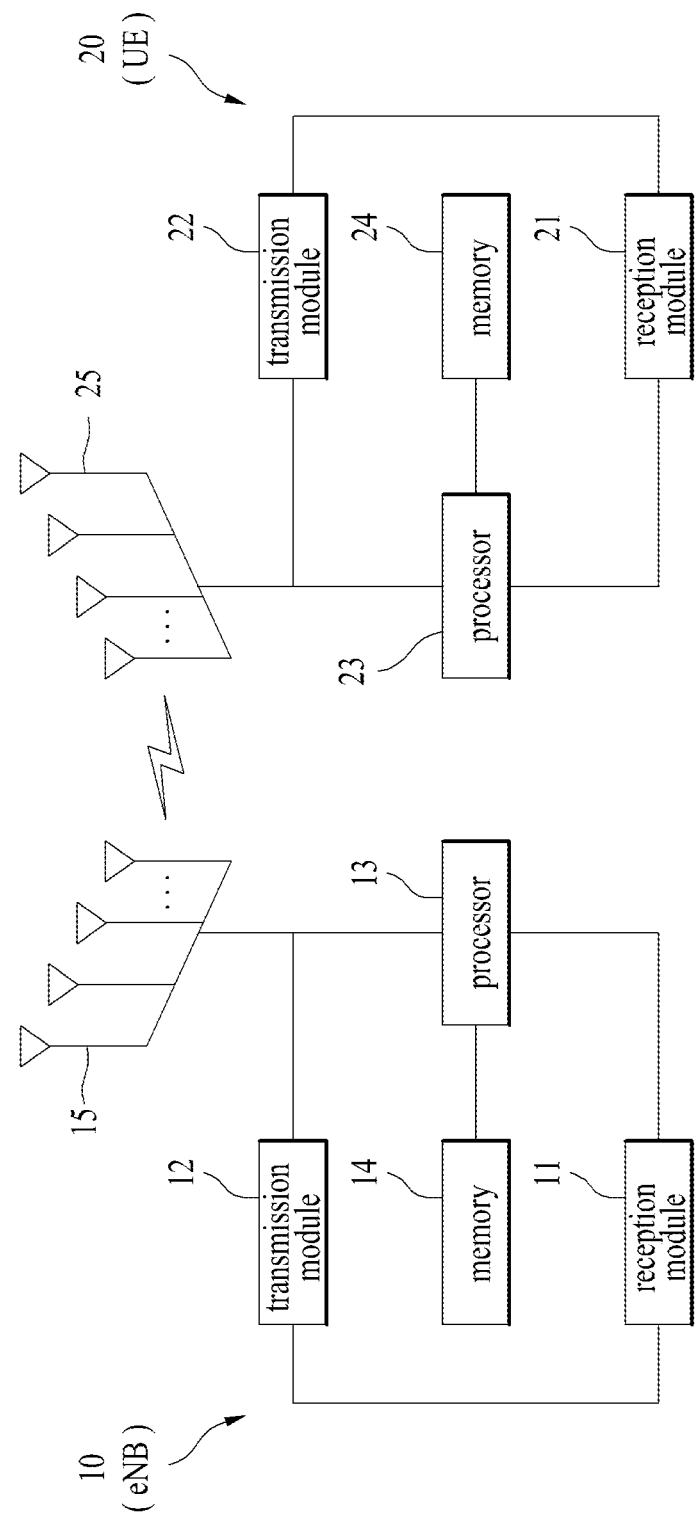
FIG. 8 is a diagram illustrating configuration of transceivers.

Configuration of Apparatuses According to an Embodiment of the Present Invention FIG. 8 is a diagram illustrating configurations of a transmission point and a UE according to an embodiment of the present invention.

Referring to FIG. 8, a transmission point 10 may include a reception module 11, a transmission module 12, a processor 13, a memory 14, and a plurality of antennas 15. The antennas 15 represent a transmission point that supports MIMO transmission and reception. The reception module 11 may receive various signals, data and information from a UE on uplink. The transmission module 12 may transmit various signals, data and information to a UE on downlink. The processor 13 may control overall operation of the transmission point 10.

The processor 13 of the transmission point 10 according to one embodiment of the present invention may perform operations necessary for the embodiments described above.

Additionally, the processor 13 of the transmission point 10 may function to operationally process information received by the transmission point 10 or information to be transmitted to the outside, etc. The memory 14, which may be replaced with an element such as a buffer (not shown), may store the processed information for a predetermined time.

Referring to FIG. 8, a UE 20 may include a reception module 21, a transmission module 22, a processor 23, a memory 24, and a plurality of antennas 25. The antennas 25 mean that the UE supports MIMO transmission and reception. The reception module 21 may receive various signals, data and information from an eNB on downlink. The transmission module 22 may transmit various signals, data and information to the eNB on uplink. The processor 23 may control overall operation of the UE 20.

The processor 23 of the UE 20 according to one embodiment of the present invention may perform operations necessary for the embodiments described above.

Additionally, the processor 23 may function to operationally process information received by the UE 20 or information to be transmitted to the outside, and the memory 24, which may be replaced with an element such as a buffer (not shown), may store the processed information for a predetermined time.

The configurations of the transmission point and the UE as described above may be implemented such that the above-described embodiments are independently applied or two or more thereof are simultaneously applied, and redundant description of parts described above is omitted for clarity.

Description of the transmission point 10 in FIG. 8 may also be applied to a relay which serves as a downlink transmitter or an uplink receiver, and description of the UE 20 may be applied to a relay which serves as a downlink receiver or an uplink transmitter.

The embodiments of the present invention may be implemented through various means such as, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for transmitting a discovery signal by a Device-to-Device (D2D) terminal in a wireless communication system, the method comprising:
    selecting, by the D2D terminal, a resource pool from among resource pools configured by a network according to a Reference Signal Received Power (RSRP) measurement result for a signal of the network at the D2D terminal, wherein a RSRP range configured for the resource pools is signaled through a Radio Resource Control (RRC) signaling from the network;
    determining, by the D2D terminal, resources to repeatedly transmit a discovery signal within the selected resource pool by applying a hopping pattern; and
    repeatedly transmitting, by the D2D terminal, the discovery signal using the determined resources.

2. The method according to claim 1, wherein open loop power control is applied to the transmitting of the discovery signal.

3. The method according to claim 1, wherein a size of a resource unit for transmitting the discovery signal varies according to the RSRP measurement result.

4. The method according to claim 3, wherein, when the D2D terminal is an out-of-coverage terminal, the size of the resource unit for transmitting the discovery signal is preset by a network operator.

5. The method according to claim 1, wherein a given number of times of repetition of the discovery signal is allocated to each of the resource pools.

6. The method according to claim 5, wherein the number of times of repetition is determined according to a size of the resource pool in a frequency domain.

7. The method according to claim 1, wherein a transmit power used in transmitting a physical uplink control channel in a subframe used to transmit the discovery signal is greater than a transmit power used in transmitting the physical uplink control channel in a subframe unused to transmit the discovery signal.

8. The method according to claim 7, wherein a parameter related to the transmit power used in transmitting the physical uplink control channel in the subframe used to transmit the discovery signal is delivered through higher layer signaling.

9. A Device-to-Device (D2D) terminal for transmitting a discovery signal in a wireless communication system, the D2D terminal comprising:
a transceiver; and
a processor,
wherein the processor is configured to:
select a resource pool from among resource pools configured by a network according to a Reference Signal Received Power (RSRP) measurement result for a signal of the network at the D2D terminal, wherein a RSRP range configured for the resource pools is signaled through a Radio Resource Control (RRC) signaling from the network;
determine resources to repeatedly transmit a discovery signal within the selected resource pool by applying a hopping pattern; and
control the transceiver to repeatedly transmit the discovery signal using the determined resources.

\* \* \* \* \*